Patented Nov. 14, 1933

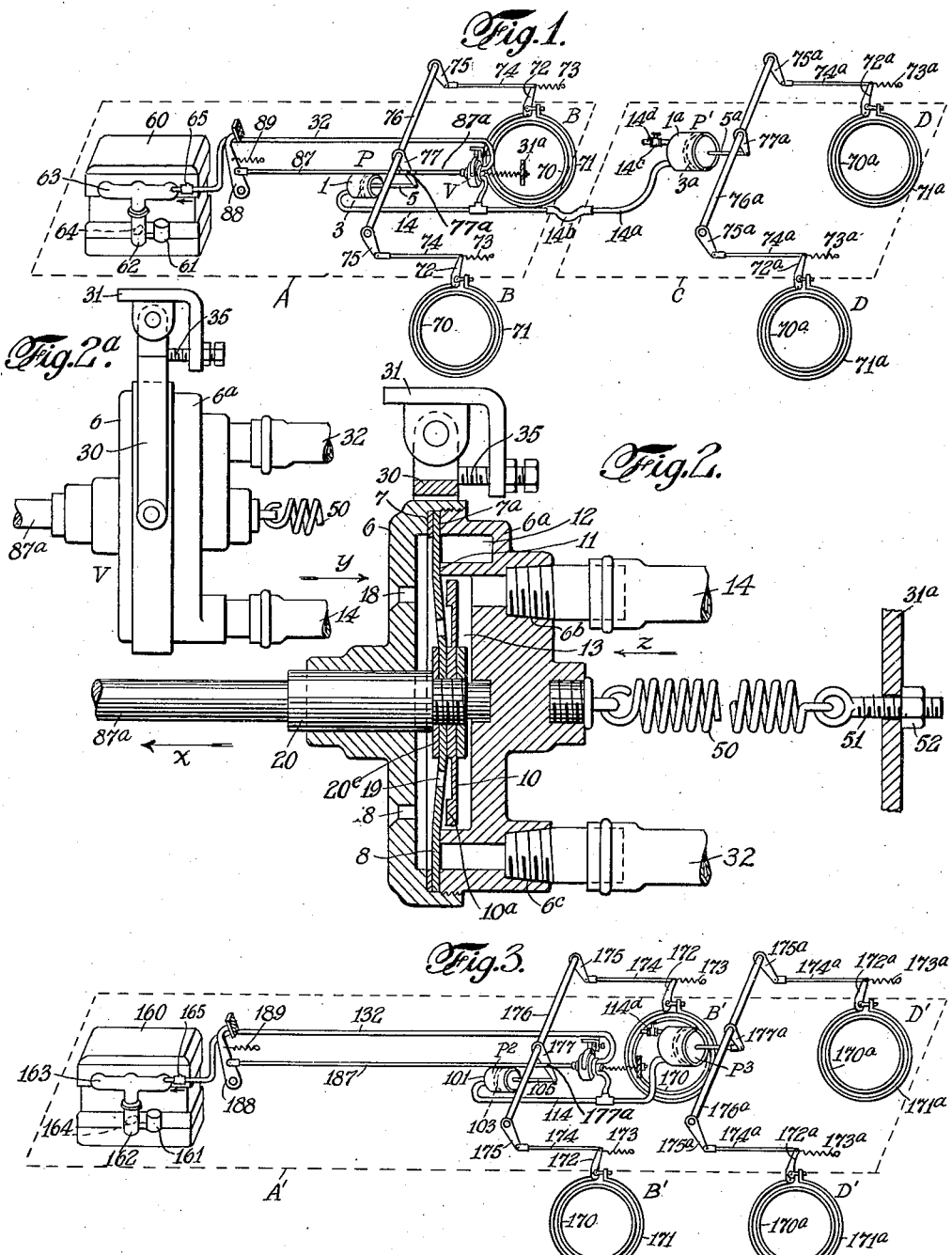

1,935,389

UNITED STATES PATENT OFFICE 1,935,389

BRAKE SYSTEM FOR AUTOMOTIVE VEHICLES

Caleb S. Bragg, Palm Beach, Fla., and Victor W. Kliesrath, Port Washington, N. Y., assignors to Bragg-Kliesrath Corporation, Long Island City, N. Y., a corporation of New York Application April 16, 1929. Serial No. 355,621

14 Claims. (Cl. 188—3)

Our invention consists in the novel features hereinafter described, reference being had to the accompanying drawing which shows several embodiments of the same selected by us for purposes of illustration, and the said invention is fully disclosed in the following description and claims.

In carrying our invention into effect, we provide an automotive vehicle, or vehicles (as a tractor and trailer), with a plurality of independently operable brake mechanisms for certain pairs of wheels, in association with a power actuator or actuators operated by differentials of fluid pressures under the control of valve mechanism, and a physically operable part, as a foot lever, which controls the actuator or actuators through said valve mechanism. A movable member of the actuator, or each of the actuators, is operatively connected with brake mechanisms for certain wheels. The physically operable part is directly connected with certain brake mechanisms operated by an actuator, without any provision for lost motion. The controlling valve mechanism for the actuator or actuators comprises a bodily movable valve casing and valve members movable with respect thereto, and subjected to the same differentials of fluid pressures as the movable member or members of the actuator or actuators controlled thereby. The valve casing and the movable valve members are connected the one with the physically operable part and the other through yielding means, such as a spring, with a part connected with the chassis of the vehicle having no movement, or limited movement with respect thereto. The differential of fluid pressures exerted on the movable valve members are applied in a direction to resist the movement of the physically operable part.

In this arrangement it will be apparent that when the operator applies his physical force to the pedal lever, the brake mechanisms directly connected with the pedal lever will be immediately actuated, and the tension of the said spring or yielding means will be increased. As soon as the tension of said resistance means is sufficient to hold the part of the valve mechanism to which it is connected against movement by and with the physically operable part, relative movement between the valve casing and valve members will result and will effect the operation of the power actuator or actuators, so as to cause it or them to assist the physical force exerted by the operator upon the brake mechanisms which are connected both with the physically operable part and the actuator or actuators. As the differential of fluid pressures in the actuator and in the valve mechanism increases, a gradually increasing resistance is exerted upon the physically operable part, and the operator is continually required to exert more and more physical force to overcome this gradually increasing resistance and the resistance of the brake mechanisms with which the physically operable part is connected, in order to keep the valve members in position to increase the power exerted by the actuator. The operator is, therefore, assisted by the power actuator proportionately to the amount of physical force which he applies to the pedal lever, and he is, therefore, apprised at all times by the varying resistance to the movement of the pedal, which he must overcome by force, as to the extent to which the brakes are being applied by the combination of his physical force and the force exerted by the actuator. Obviously, all of the force which the operator exerts to overcome this resistance is directly applied to the brakes with the exception of that required to overcome the increasing resistance of the valve mechanism.

Our invention also comprises the novel features of construction and combination of parts hereinafter described and particularly pointed out in the claims.

Referring to the accompanying drawing which shows several embodiments of our invention selected by us for purposes of illustration, Fig. 1 is a diagrammatic view representing our improved brake system applied to a tractor vehicle and a trailer.

Fig. 2 is an enlarged sectional view of the valve mechanism illustrated in Fig. 1.

Fig. 2a is a detail showing one means for supporting the valve mechanism.

Fig. 3 is a view similar to Fig. 1 showing our improved brake system applied to a single vehicle.

Referring to Figs. 1, 2 and 2a of the drawing, we have illustrated at A, Fig. 1, in dotted lines a tractor vehicle provided with an internal combustion engine, 60, having a carburetor, 61, a suction passage comprising a vertical portion, 62, and an intake manifold, 63, and provided with the usual throttle valve, 64, between the carburetor and the manifold. In this instance the tractor vehicle is shown provided with brake mechanisms, B, B, for the rear wheels thereof, but it is to be understood that the brake mechanisms may be of any usual or preferred type and may be applied to any number of wheels of the vehicle. In this instance each brake mechanism is shown as comprising a brake drum, 70, brake band, 71, and brake lever, 72, provided with a retracting spring, 73. The brake levers, 72, are connected by links, 74, with arms, 75, on a rock shaft, 76. 88 represents the usual pedal lever provided with a retracting spring, 89, and directly connected by a rod, 87, with an arm, 77, on the rock shaft, 76, so that a forward movement of the pedal lever will actuate the brakes connected therewith, in this instance the brakes B, B. Rod 87 is pivotally connected with the arm 77 at 77$^a$.

In Fig. 1 we have indicated in dotted lines at C a trailer vehicle, which is provided with a plurality of brake mechanisms, indicated at D, D, of any desired type and number. In this instance the brake mechanisms are shown as being of the kind previously described and connected for joint operation with the rock shaft, 76$^a$, the other parts being given the same numerals as those previously mentioned with the addition of the letter $a$. P represents a power actuator, in this instance located on the tractor and comprising a cylinder, 1, closed at one end and open at the other, and a piston, 3, having its piston rod, 5, connected with the arm, 77, on the rock shaft, 76, for operating the tractor brakes with which the pedal lever is connected. P$^1$ represents a second power actuator, in this instance mounted on the trailer, comprising a cylinder, 1$^a$, and piston, 3$^a$, the piston rod, 5$^a$, of which is connected to an arm, 77$^a$, on the rock shaft, 76$^a$, for operating the trailer brakes by power. These power actuators are designed to be operated by the differential of fluid pressures obtained from the atmosphere, acting as the higher fluid pressure, against the rarification or partial vacuum, as the lower fluid pressure, obtained by a connection with the suction passage of the engine between the throttle valve, 64, and the engine cylinders. The actuators are controlled by suitable valve mechanism, indicated as a whole at V and illustrated in detail in Figs. 2 and 2$a$. The particular construction of the valve mechanism herein shown and described forms no part of our present application and will not be herein specifically claimed, as it forms the subject matter of our previous applications for Letters Patent of the United States, Serial No. 231,724, filed November 7, 1927 and Serial No. 283,182, filed June 6, 1928. The valve mechanism will, however, be briefly described in order that our present invention may be clearly understood. This valve mechanism, which is shown in released position in Fig. 2, comprises a hollow valve casing preferably formed of two members, 6 and 6$^a$, threaded one upon the other, and provided with annular clamping portions, 7 and 7$^a$. The casing member, 6$^a$, is provided interiorly with an annular seat, 11, dividing the interior into an annular suction chamber, 12, and a central chamber, 13, said seat adapted to be engaged by a diaphragm, 8, having its marginal portions in sealing engagement with the valve casing and preferably clamped between the annular clamping portions, 7 and 7$^a$. The diaphragm, 8, is provided with apertures, 19, which are at all times in communication with the atmosphere through apertures, 18, in the casing member, 6. Within the valve casing is a cup-shaped disc valve, 10, having an annular flange, or seat, 10$^a$, for engaging the diaphragm upon its inner face to make an air tight connection therewith. The disc valve and the diaphragm are rigidly connected with a valve actuating part, 20, movable through a central aperture in the casing member, 6. The casing member, 6$^a$, is provided with an aperture, 6$^b$, communicating with the interior chamber, 13, and adapted to be connected with the cylinder, 1, of the power actuator, by a pipe, 14. The casing member, 6$^a$, is also provided with an aperture, 6$^c$, communicating with the annular suction chamber, 12, which is adapted to be connected by a suction pipe, 32, with the suction passage of the engine between the throttle valve, 64, and the engine cylinders, being in this instance connected with the intake manifold, 63, and provided preferably with a check valve, 65, opening in the direction of the arrow adjacent thereto, in Fig. 1. Where a second actuator, P$^1$, is also employed, the pipe 14, will be provided with a branch pipe, 14$^a$, connected with the cylinder, 1$^a$, of the actuator, P$^1$, and where the actuator, P$^1$, is located on a trailer as shown in Fig. 1, the extension pipe, 14$^a$, will be provided with a flexible portion, 14$^b$, in a well known way.

The valve casing is movably supported with respect to the chassis so as to be bodily movable. In this instance it is shown as pivoted to a yoke, 30, which is in turn pivotally supported from a fixed part of the chassis, indicated at 31. The valve casing is shown connected with a yielding resistance member, for example a coiled spring, 50, which may be either of the expansion or compression type, but is here shown as an expansion spring. The rear end of this spring is connected in this instance to a fixed part of the chassis, indicated at 31$^a$, by an adjusting device comprising in this instance an eye-bolt, 51, and nut, 52, by means of which the calibration of the spring may be varied. The valve actuating part, 20, is connected positively with the foot lever, 88, in this instance by a link, 87$^a$, connected to the rod, 87, and arm, 77.

The relative movement between the valve actuating part, 20, and the valve casing is limited, in this instance by a collar, 20$^c$, on the valve actuating part which engages the casing member, 6, when the valve actuating part has been drawn out to its fullest extent. Assuming that the engine is running with the throttle valve closed or partly closed, which is the normal position of the throttle valve when the brakes are to be applied, rarification will be produced in the suction passage of the engine and the air will be exhausted from the suction pipe, 32, and from the annular suction chamber, 12, which is disconnected from the actuator cylinder or cylinders by the seating of the diaphragm, 8, on seat, 11. In the released position of the valve mechanism shown in Fig. 2, the disc valve is unseated from the diaphragm and air has access to the closed ends of the actuator cylinders through the apertures, 18 and 19, chamber, 13, and cylinder pipes, 14, 14$^a$ and 14$^b$. As the outer face of each actuator piston is always exposed to atmosphere, the fluid pressures on the pistons thereof are equal and the brakes are held in released position by their retracting spring. The foot lever will be in its retracted position under the influence of spring, 89, and we prefer to provide the support for the yoke, 30, with an adjustable stop, 35, best shown in Fig. 2$a$, to limit the return movement of the valve casing and insure the return of the valves, 8 and 10, to their normal position under the influence of spring, 89, in which positions they will also be held by the differential of fluid pressures on the marginal portions of the diaphragm, 8, extending over the suction chamber, 12, when rarification exists therein.

If it is desired to apply the brake mechanisms of the vehicle or vehicles, the operator will depress the pedal, 88, causing a responsive movement of the parts connected therewith which starts the application of those brake mechanisms with which the pedal is connected, in this instance the brakes, B, B, and at the same time effecting a movement of the valve mechanism. If the tension of the spring, 50, is such as to hold the valve casing against movement, the part, 20, will be drawn forward, seating the disc valve, 10, on the diaphragm, thus closing off the connection between the closed ends of the cylinders and the atmosphere, and thereafter unseating the diaphragm, 8, to connect the actuator cylinders with suction. The unseating of diaphragm, 8, will be followed by a movement of each actuator piston within its cylinder, the movement of piston, 3, assisting the operator in the application of brakes, B, B, and the movement of piston, 3a, applying the trailer brakes. If the calibration of the spring is such that it will yield somewhat before the diaphragm is unseated, the first portion of the movement of the foot lever will start the application of the brakes, B, B, with which it is connected, a movement of the valve mechanism bodily, and also a movement of the actuator piston, 3. In such case the valve mechanism will be operated to bring the actuator or actuators into operation as soon as the tension of spring, 50, becomes sufficient to hold the valve casing against further movement. The adjustment of the spring, 50, will therefore determine the point in the stroke of the physically operable part or pedal at which the valve mechanism will operate and start the application of the power actuator or actuators to assist the operator from that point on in applying the brakes.

The calibration of the spring, 50, is preferably such that the power applied by the actuator, P, can never equal the force required to move the brake rodding and brake mechanisms, B, B, connected therewith, to obtain any desired braking force without the added physical force supplied by the operator through the pedal lever, and the capacity of the actuator is preferably such that the operator must apply more and more physical strength as the brakes are applied with greater force, in order to keep the diaphragm valve, 8, unseated. The force exerted by the operator's foot on the pedal is therefore resisted by the increasing reactionary resistance of the brakes, B, B, with which the pedal is directly connected, and also by the differential of fluid pressures on the valve mechanism, and to a slight extent by the increased tension of the spring, so that the operator can tell by the increasing resistance to his foot the amount of power which is being applied to the brake mechanisms.

It will be understood that as soon as the diaphragm valve is unseated, a differential of fluid pressures on the pistons will result as the air is sucked out of the closed ends of the actuator cylinders. A corresponding differential of fluid pressures will be built up on the opposite faces of diaphragm, 8, and disc, 10, acting in the direction of the arrow, y, in Fig. 2, which is transmitted to the operator's foot through the pedal lever. At the same time there will be a corresponding differential of fluid pressures on the opposite faces of the rear wall of the valve casing member, 6a, acting in the direction of the arrow, z, Fig. 2, and tending to push the valve casing bodily forward with respect to the diaphragm, 8, in opposition to the spring, 50. The differential of fluid pressures on the valve mechanism therefore acts in the opposite directions indicated by the arrows, y and z, in Fig. 2, to resist the diaphragm, 8. Whenever the operator stops the forward movement of the pedal, that is to say, whenever he ceases to increase the amount of force applied to the pedal, he will hold the brakes as applied as far as his physical force is concerned, and the increasing rarification within the valve mechanism, corresponding with that in the actuator cylinder or cylinders, will bring about an increased differential of fluid pressures on the valve mechanism, causing it to move bodily forward and seat the diaphragm, 8, thus closing off the communication between the actuator cylinders and the suction source. It is possible that there may be a slight increase in the differential of fluid pressures on the actuator pistons after the operator has stopped the forward movement of the pedal due to a minute lag in the seating of the diaphragm, 8, but this will not result in a further or continued application of the brakes provided the operator does not permit a further forward movement of the foot pedal, which may be easily accomplished by adjusting his pressure on the pedal so as to prevent forward movement thereof.

As the power exerted by the actuator, P, is not sufficient without the assistance of the physical force of the operator to apply the brake mechanism to that point or to hold it applied at that point, it follows that at any point throughout the throw of the brake pedal the operator may, by releasing same or all of his pressure on the pedal, allow the connected brake mechanisms to pull the actuator piston, 3, rearwardly, such movement being sufficient to permit a further reaction between the parts of the valve mechanism to restore them to released position and admit air to the closed ends of the actuators and release the brakes. At any time during the release of the brakes the operator, by stopping the rearward movement of the pedal, may hold the brakes as applied, the disc valve, 10, automatically seating when sufficient air has been admitted to bring the differential of fluid pressures in the valve mechanism to a point where it counterbalances the tension of the spring.

Obviously in the construction shown in Fig. 1, the power actuator, P1, on the trailer will act substantially in unison with the power actuator, P, to apply, hold and release the brake mechanisms without assistance from the physical force of the operator, and will conform to the operation of the actuator, P. It will be understood that an additional actuator or actuators could also be controlled by the valve mechanism, V, if desired, and in Fig. 1 we have shown the actuator cylinder, P1, provided at its closed end with a pipe, 14c, for connecting it to another actuator or actuators, said pipe being provided with a cock, 14d, to close it when no other actuator is connected therewith.

In Fig. 3 we have shown a slight modification of our invention in which all the brake mechanisms of the system are located upon the same vehicle, which is indicated in dotted lines at A1. The vehicle is shown in this instance as provided with brake mechanisms, B1, B1, connected with an actuator, P2, and also connected with the physically operable part, 188. We have also shown a second power actuator, P3, connected with brake mechanisms, D1, D1, in this instance mounted on the same vehicle. The other parts of the apparatus shown in Fig. 3 are identical with those illustrated in Fig. 1 and are given the same reference numerals with the addition of 100 and operate in the manner previously described.

As hereinbefore stated and as illustrated in the drawing, the physically operable part is directly connected, i. e., without lost motion, with certain brake mechanisms for the purpose of initiating the application thereof by physical force alone and thereafter continuing the application of physical force thereto with the assistance of the actuator when called into action by the operation of the valve mechanism if the engine is running, and permitting the operator to add further physical force after the actuator has exerted its maximum power, and also permitting the operator to apply the brake mechanisms so connected with the physically operable part by physical force alone in case of failure of power.

In the following claims the expression "directly connected" with respect to the physically operable part is to be taken as meaning that the connection is without lost motion regardless of the character or extent of said connections.

What we claim and desire to secure by Letters Patent is:—

1. In a brake system for automotive vehicles, the combination with a power actuator having relatively movable members and operating by differentials of fluid pressures, remote controlling valve mechanism for said actuator, and connections from a movable member of the actuator to brake mechanisms, of a physically operable part directly connected to said brake mechanisms for initiating the application thereof by physical force and thereafter continuing the application of physical force thereto, and operatively connected with said valve mechanism for applying the power of the actuator to said brake mechanisms to assist the physical force of the operator, said valve mechanism being so constructed and arranged with respect to said physically operable part as to oppose the movement thereof during the operation of the brake, the said connections between the brake mechanisms and physically operable part, between the brake mechanisms and the valve and between the movable actuator member and brake mechanisms including a part in common.

2. In a brake system for automotive vehicles, the combination with a power actuator having relatively movable members and operating by differentials of fluid pressures, connections from a movable member of said actuator to brake mechanisms, controlling valve mechanism for said actuator provided with relatively movable parts, subjected to differentials of fluid pressures corresponding to those to which the said movable actuator part is subjected, of a physically operable part connected to said brake mechanisms for initiating their application by physical force and thereafter continuing the application of physical force thereto, a resistance spring for said valve mechanism connected with the vehicle, the relatively movable parts of said valve mechanism being connected respectively with the said physically operable part and with said resistance spring.

3. In a brake system for automotive vehicles, the combination with a power actuator having relatively movable members and operating by differentials of fluid pressures, connections from a movable member of said actuator to brake mechanisms, controlling valve mechanism for said actuator provided with relatively movable parts, subjected to differentials of fluid pressures corresponding to those to which the said movable actuator part is subjected, of a physically operable part connected to said brake mechanisms for initiating their application by physical force and thereafter continuing the application of physical force thereto, a resistance spring for said valve mechanism connected with the vehicle, the relatively movable parts of said valve mechanism being connected respectively with the said physically operable part and with said resistance spring, said spring being calibrated so that the power applied by the actuator alone to said brake mechanisms can never equal the total force required to effect the movement of said brake mechanisms sufficiently to obtain any desired braking effect under the control of the physically operable part.

4. In a brake system for automotive vehicles, the combination with a power actuator operatively connected with brake mechanisms and operated by differentials of fluid pressures, controlling valve mechanism for said actuator movable bodily with respect to the vehicle, and comprising relatively movable parts subjected to the differentials of fluid pressures existing in the actuator and exerted in a direction to return said valve mechanism toward released position, a physically operable part directly connected with said brake mechanisms for initiating the application thereof by physical force and thereafter continuing the application of physical force thereto, the relatively movable parts of said valve mechanism being connected respectively with said physically operable part and with a resistance spring.

5. In a brake system for automotive vehicles, the combination with a power actuator operatively connected with brake mechanism and operated by differentials of fluid pressures, controlling valve mechanism for said actuator movable bodily with respect to the vehicle, and comprising relatively movable parts subjected to the differentials of fluid pressures existing in the actuator and exerted in a direction to return said valve mechanism toward released position, a physically operable part directly connected with said brake mechanisms for initiating the application thereof by physical force and thereafter continuing the application of physical force thereto, the relatively movable parts of said valve mechanism being connected respectively with said physically operable part and with said resistance spring, said spring being calibrated so that the power applied by the actuator alone to said brake mechanisms will be insufficient to obtain any desired braking effect under the control of the physically operable part.

6. In a brake system for automotive vehicles, the combination with a power actuator operatively connected with brake mechanisms and operated by differentials of fluid pressures, controlling valve mechanism for said actuator movable bodily with respect to the vehicle, and comprising relatively movable parts subjected to the differentials of fluid pressures existing in the actuator and exerted in a direction to return said valve mechanism toward released position, a physically operable part directly connected with said brake mechanisms for initiating the application thereof by physical force and thereafter continuing the application of physical force thereto, the relatively movable parts of said valve mechanism being connected respectively with said physically operable part and with said resistance spring, and means independent of the operator operated part for varying the tension of said spring to vary the point in the stroke of the physically operable part at which the valve mechanism will be operated to effect a power stroke of the actuator, and to vary the maximum force to be exerted by the actuator.

7. In a brake system for automotive vehicles, the combination with a power actuator operatively connected with brake mechanisms and operated by differentials of fluid pressures, controlling valve mechanism for said actuator movable bodily with respect to the vehicle, and comprising relatively movable parts subjected to the differentials of fluid pressures existing in the actuator and exerted in a direction to return said valve mechanism toward released position, a physically operable part directly connected with said brake mechanisms for initiating the application thereof by physical force and thereafter continuing the application of physical force thereto, the relatively movable parts of said valve mechanism being connected respectively with said physically operable part and with said resistance spring, said spring being calibrated so that the power applied by the actuator alone to said brake mechanisms will be insufficient to obtain any desired braking effect under the control of the physically operable part, and means independent of the operator operated part for varying the calibration of said spring.

8. In a brake system for automotive vehicles, the combination with a plurality of power actuators, each of which is operatively connected with certain brake mechanisms and operated by differentials of fluid pressures, a physically operable part directly connected with certain brake mechanisms which are operatively connected with at least one of said power actuators, controlling valve mechanism operatively connected with and controlling all of said actuators and movable bodily with respect to the vehicle, and comprising relatively movable parts subjected to the differentials of fluid pressures existing in said actuators and exerted in a direction to return said valve mechanism toward released position, a resistance spring for said valve mechanism connected with the vehicle, the relatively movable parts of said valve mechanism being connected respectively with said physically operable part and said resistance spring.

9. In a brake system for automotive vehicles, the combination with a plurality of power actuators, each of which is operatively connected with certain brake mechanisms and operated by differentials of fluid pressures, a physically operable part directly connected with certain brake mechanisms which are operatively connected with at least one of said power actuators, controlling valve mechanism operatively connected with and controlling all of said actuators and movable bodily with respect to the vehicle, and comprising relatively movable parts subjected to the differentials of fluid pressures existing in said actuators and exerted in a direction to return said valve mechanism toward released position, a resistance spring for said valve mechanism connected with the vehicle, the relatively movable parts of said valve mechanism being connected respectively with said physically operable part and said resistance spring, said spring being calibrated so that the power applied by the actuator or actuators alone to the brake mechanisms directly connected with the physically operable part will be insufficient to obtain any desired braking effect thereof under the control of said physically operable part.

10. In a brake system for automotive vehicles comprising a tractor and trailer, each provided with brake mechanisms, the combination with a power actuator operated by differentials of fluid pressures located on the trailer and connected with brake mechanisms therefor, a power actuator operated by differentials of fluid pressures located on the tractor and connected with brake mechanisms therefor, a physically operable part mounted on the tractor and connected directly to brake mechanisms for the tractor operatively connected with the power actuator thereon, controlling valve mechanism connected with and controlling both actuators and operatively connected with said physically operable part.

11. In a brake system for automotive vehicles comprising a tractor and trailer, each provided with brake mechanisms, the combination with a power actuator operated by differentials of fluid pressures located on the trailer and connected with brake mechanisms therefor, a power actuator operated by differentials of fluid pressures located on the tractor and connected with brake mechanisms therefor, a physically operable part mounted on the tractor and connected directly to brake mechanisms for the tractor operatively connected with the power actuator thereon, controlling valve mechanism connected with and controlling both actuators and comprising relatively movable parts subjected to the differentials of fluid pressures corresponding with those in the actuators, a resistance spring for said valve mechanism connected with the tractor, the relatively movable parts of said valve mechanism being connected respectively to said spring and to the physically operable part.

12. In a brake system for automotive vehicles comprising a tractor and trailer, each provided with brake mechanisms, the combination with a power actuator operated by differentials of fluid pressures located on the trailer and connected with brake mechanisms therefor, a power actuator operated by differentials of fluid pressures located on the tractor and connected with brake mechanisms therefor, a physically operable part mounted on the tractor and connected directly to brake mechanisms for the tractor operatively connected with the power actuator thereon, controlling valve mechanism connected with and controlling both actuators and comprising relatively movable parts subjected to the differentials of fluid pressures corresponding with those in the actuators, a resistance spring for said valve mechanism connected with the tractor, the relatively movable parts of said valve mechanism being connected respectively to said spring and to the physically operable part, said spring calibrated so that the power applied by the actuator on the tractor alone to the brake mechanisms of the tractor, directly connected with the physically operable part, will be insufficient to obtain any desired braking effect thereof under the control of the physically operable part.

13. In a brake system for automotive vehicles, the combination with a power actuator having relatively movable members and operating by differentials of fluid pressures, connections from a movable member of said actuator to brake mechanisms, controlling valve mechanism for said actuator provided with relatively movable parts, subjected to differentials of fluid pressures corresponding to those to which the said movable actuator is subjected, of a physically operable part connected to said brake mechanisms for initiating their application by physical force and thereafter continuing the application of physical force thereto, the relatively movable parts of said valve mechanism being connected respectively with the said physically operable part and with a rigid member secured to the chassis of the vehicle, the connection between said physically operable part and said brake mechanisms being independent of the connection between the valve and the physically operable part.

14. In a brake system for automotive vehicles, the combination with a power actuator having relatively movable members and operating by differentials of fluid pressures, controlling valve mechanism for said actuator and connections from a movable member of the actuator to brake mechanisms, of a physically operable part directly connected to said brake mechanisms, to said movable member and to said controlling valve, said connections being such as to initiate the application of the brake mechanisms by physical force and thereafter continue the application of physical force thereto, said valve mechanism being actuated to render the power actuator operative to apply the brake mechanisms after the aforementioned initiation of the brake aplication by physical force, said valve mechanism being constructed and arranged to oppose the movement of said physically operated part during the application of the brakes to thereby apprise the operator of the degree of power operation.

CALEB S. BRAGG.
VICTOR W. KLIESRATH.